United States Patent
Tanaka et al.

(10) Patent No.: US 6,292,621 B1
(45) Date of Patent: *Sep. 18, 2001

(54) RECORDING APPARATUS FOR NEWLY RECORDING A SECOND ENCODED DATA TRAIN ON A RECORDING MEDIUM ON WHICH AN ENCODED DATA TRAIN IS RECORDED

(75) Inventors: Yasuyuki Tanaka, Tokyo; Akio Fujii, Yokohama; Masato Kato, Omiya, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/794,090

(22) Filed: Feb. 3, 1997

(30) Foreign Application Priority Data

Feb. 5, 1996 (JP) .................................................. 8-018757
Feb. 5, 1996 (JP) .................................................. 8-018761
Mar. 13, 1996 (JP) .................................................. 8-055966

(51) Int. Cl.[7] .................................................. H04N 5/93
(52) U.S. Cl. .................................. 386/56; 386/52; 386/68
(58) Field of Search ............................. 386/6–8, 33, 52, 386/68, 81–82, 111–112, 56; H04N 5/93

(56) References Cited

U.S. PATENT DOCUMENTS

| | | | |
|---|---|---|---|
| 4,974,111 | * 11/1990 | Platte et al. .................... | 386/56 |
| 5,377,051 | * 12/1994 | Lane et al. ...................... | 360/33.1 |
| 5,570,199 | 10/1996 | Tanaka et al. ................... | 386/95 |
| 5,579,183 | * 11/1996 | Van Gestel et al. .............. | 360/48 |
| 5,619,337 | * 4/1997 | Niampally ........................ | 386/83 |
| 5,684,915 | * 11/1997 | Ueda et al. ...................... | 386/68 |
| 5,684,917 | * 11/1997 | Yanagihara et al. .............. | 386/80 |
| 5,692,092 | * 11/1997 | Nogami et al. ................... | 386/6 |
| 5,734,783 | * 3/1998 | Shimoda et al. .................. | 386/68 |
| 5,778,143 | * 7/1998 | Boyce .............................. | 386/111 |
| 5,793,927 | * 8/1998 | Lane ................................ | 386/81 |
| 5,809,201 | * 9/1998 | Nagasawa ........................ | 386/68 |
| 5,812,734 | * 9/1998 | Shimoda et al. .................. | 386/81 |
| 5,845,042 | * 12/1998 | Yanagihara ...................... | 386/81 |
| 5,845,043 | * 12/1998 | Yanagihara ...................... | 386/109 |
| 5,867,625 | * 2/1999 | McLaren .......................... | 386/68 |
| 5,889,918 | * 3/1999 | Sakazaki et al. ................. | 386/68 |
| 6,018,611 | * 1/2000 | Nogami et al. ................... | 386/52 |

* cited by examiner

*Primary Examiner*—Wendy R. Garber
*Assistant Examiner*—Vincent F. Boccio
(74) *Attorney, Agent, or Firm*—Fitzpatrick, Cella, Harper & Scinto

(57) ABSTRACT

A recording apparatus with good specific reproduction for recording encoded data on a recording medium, the encoded data being multiplexed data of image data encoded through intraframe encoding, image data encoded through interframe encoding, and program data describing the contents of each image data. The image data encoded through intraframe encoding is extracted, the contents of the program data for the extracted image data are changed and multiplexed with the image data, the multiplexed data is recorded on the recording medium in a predetermined area.

12 Claims, 15 Drawing Sheets

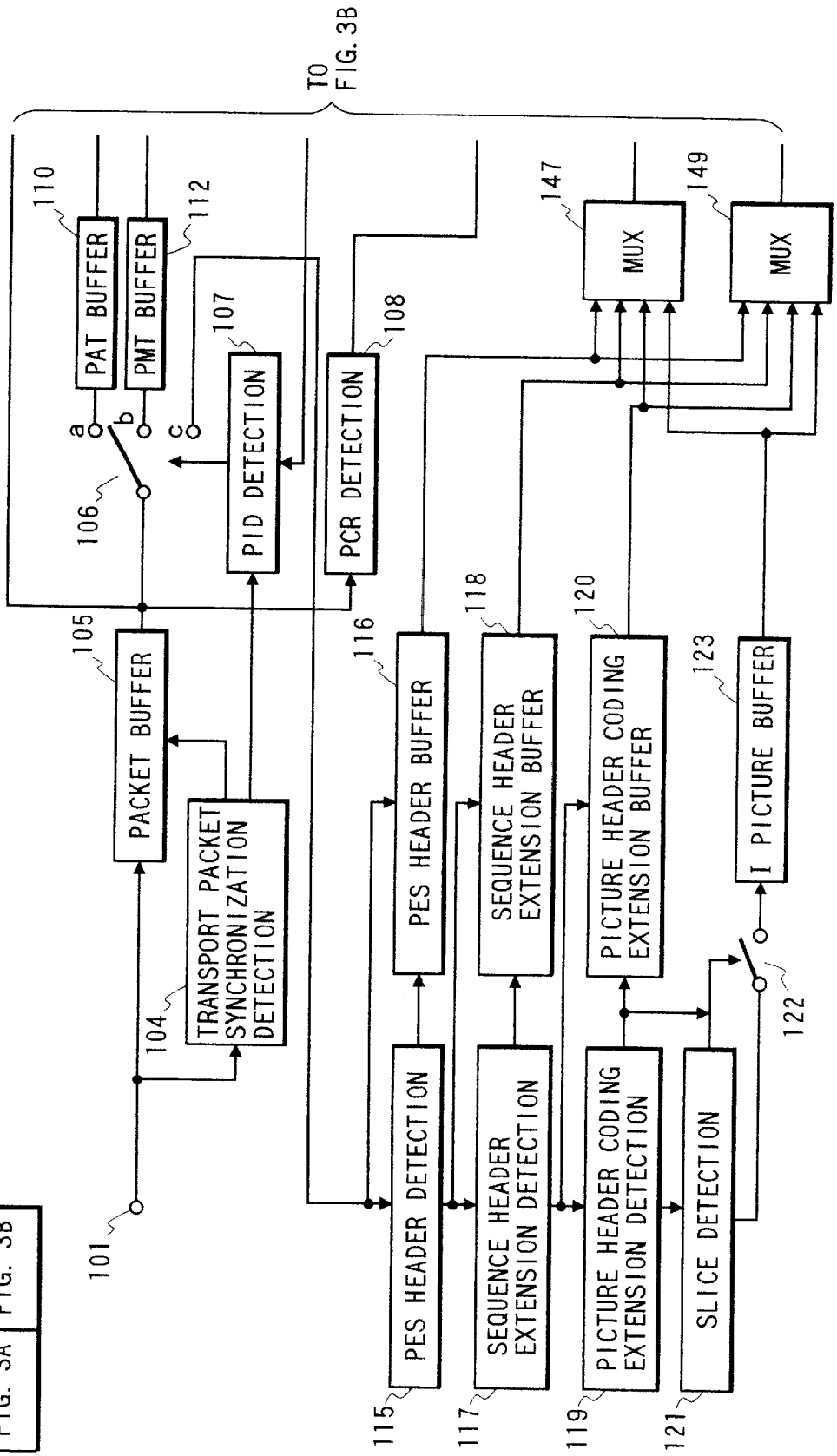

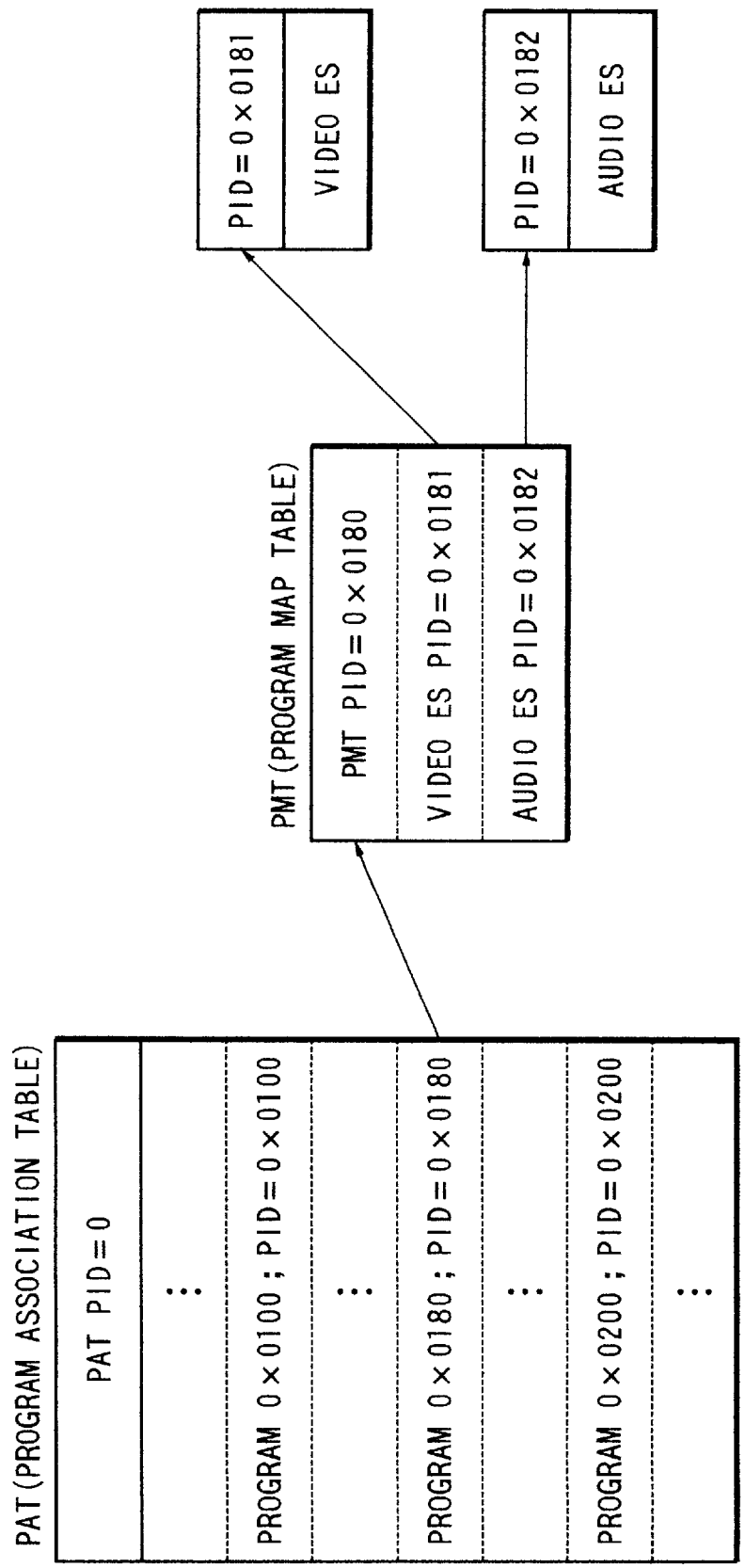

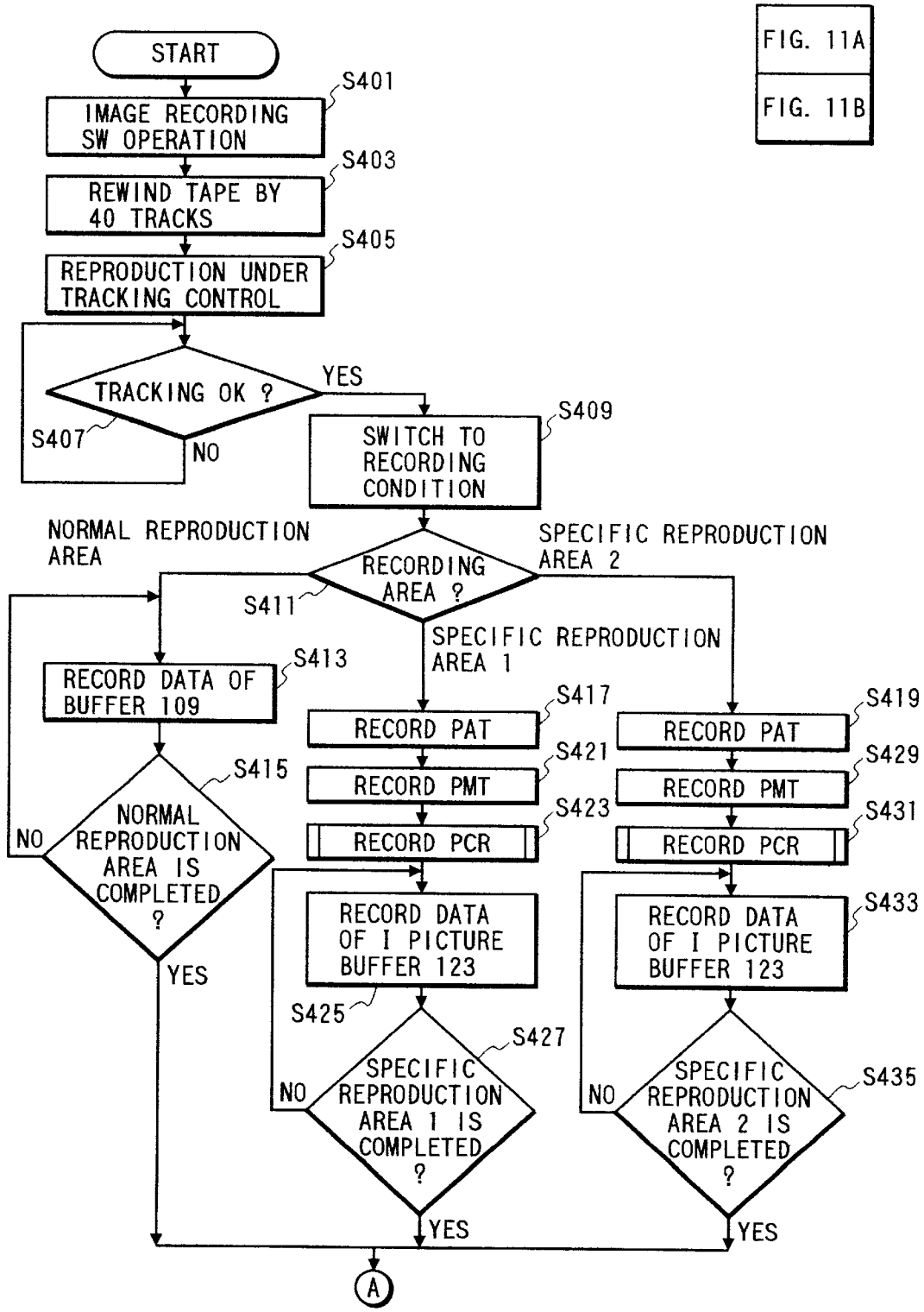

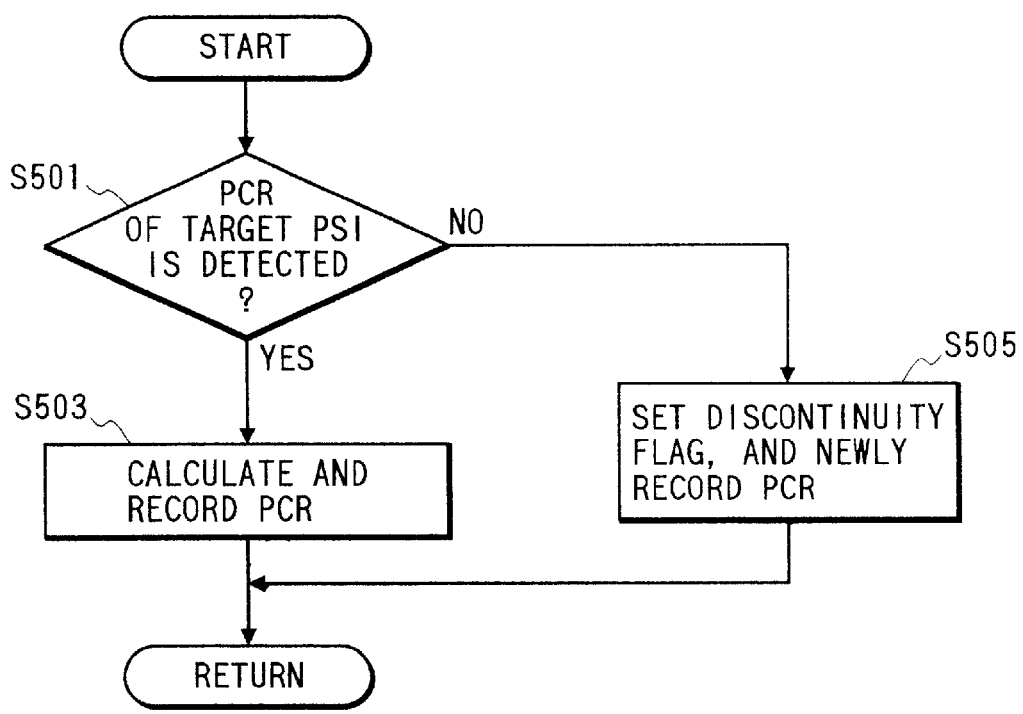

RECORDING APPARATUS FOR NEWLY RECORDING A SECOND ENCODED DATA TRAIN ON A RECORDING MEDIUM ON WHICH AN ENCODED DATA TRAIN IS RECORDED

BACKGROUND OF THE INVENTION

1. Field of the Invention

The present invention relates to a recording apparatus, and more particularly to an apparatus for recording image signals encoded through interframe prediction.

2. Related Background Art

Digital data processing is vigorously studied nowadays. Various methods for standardization, particularly of high efficiency coding for image data compression have been proposed and discussed. Of these, a general coding scheme MPEG 2 (Moving Picture Coding Expert Group) has drawn attention which is adopted to ATV (Advanced Television) of next generation TV broadcast of U.S.A.

MPEG 2 is a motion compensation type prediction coding method of compressing information amount and coding data by utilizing correlation between image frames. In FIG. 1, arrows indicate directions of coding predication. FIG. 2 is a diagram illustrating coding by MPEG 2, data order on media, and image data order in decoding.

In MPEG 2, a GOP (Group of Pictures) is constituted of a predetermined number of frames. Each GOP includes at least one frame of intraframe encoded images.

An intraframe encoded image (hereinafter called an I image) is an image encoded by using image data only in one frame, through DCT and quantization. Image data at every Nth frame from the I image is encoded through interframe prediction coding (hereinafter called a P image). Image data of each frame between I and P images and between P images is encoded through bidirectional prediction coding by using image data of backward and forward frames (hereinafter called a B image).

As shown in FIGS. 1 and 2, first I images are formed. As described above, an I image is encoded by using image data of only one frame, and prediction using data of other frames is not performed. Next, P images are formed, and B images are formed after I or P image. The I, P, and B images are transmitted in this order.

In MPEG 2, a data stream of encoded image/voice data or other data is called an elementary stream. As a structure for transmitting an elementary stream, a PES (Packetized Elementary Stream) packet has been defined. This structure has a PES payload (data field) following a PES header. In MPEG 2, a set of elementary streams having the common time axis is called a program.

Two formats have been defined for multiplex in MPEG 2. One is a transport stream and the other is a program stream.

Both definitions of the transport stream and the program stream contain necessary and sufficient syntax for synchronizationronization when decoding and reproducing images and voices. The program stream is a single data stream obtained by connecting one or more PES packets having the common time axis. The transport stream is a single data stream obtained by connecting one or more programs having one or more time axes. The above mentioned ATV uses the transport stream.

In the transport stream, data of images, voices, and the like is transmitted by dividing it into a transmission unit of a fixed length of 188 bytes called a transport packet.

Information such as various identifiers called a PCR (Program Clock Reference) and a PSI (Program Specific Information) used for synchronization is inserted where necessary into the transport stream. This information is detected to correctly decode the encoded data.

PSI contains information for discriminating a PID (Packet ID) or the like, called a PAT (Program Association Table) or a PMT (Program Map Table). This information is used for detecting and decoding a packet containing a target program or data.

As described earlier, since the I image is encoded by using image data of only one frame, the encoded data can be decoded by using only this encoded data. On the other hand, since the P and B images are encoded by using image data of other frames, the encoded data cannot be decoded by using only the encoded data.

The data length of each of I, P, and B image data is variable. Therefore, if image data encoded by MPEG 2 is recorded in a recording medium such as a magnetic tape, the location of the I image on the recording medium cannot be identified.

For example, if image data encoded by MPEG 2 is recorded in a magnetic tape by using an apparatus such as a digital VTR, the original image data can be correctly reproduced if it is reproduced at the same speed as recording, because the image data is reproduced in the order of recording, i.e., in the order of encoding.

However, in specific reproduction such as high speed search, the head transversely traces a tape so that each encoded image I, P, and B is not reproduced in the order of encoding. Furthermore, since each head traces only a fraction of each track, the location of the I image on the tape cannot be identified as described above and the I image is not necessarily reproduced correctly. Therefore, specific reproduction is associated with a problem that image data cannot be reproduced correctly.

SUMMARY OF THE INVENTION

It is an object of the present invention to solve the above-described problems.

It is another object of the invention to reliably realize specific reproduction of encoded image signals.

It is a further object of the invention to allow a signal to be reproduced quickly from a recording medium.

Under the above objects, an embodiment of the invention provides an apparatus for recording encoded data on a recording medium, the encoded data being multiplexed data of first image data encoded through intraframe encoding, second image data encoded through interframe encoding, and program data describing the contents of the first and second image data, the apparatus comprising: (a) extracting means for extracting the first image data and the program data for the first image data from the encoded data; (b) changing means for changing the contents of the program data extracted by the extracting means; (c) generating means for generating second encoded data by multiplexing the first image data extracted by the extracting means and the program data changed by the changing means; and (d) recording means for recording the second encoded data on the recording medium in a predetermined area.

The other objects and features of the invention will become apparent from the following detailed description of the embodiments when read in conjunction with the accompanying drawings.

BRIEF DESCRIPTION OF THE DRAWINGS

FIGS. 6A and 6B are diagrams illustrating the operation of generating PSI by the circuit shown in FIGS. 3A and 3B.

FIG. 12 is a flow chart illustrating a PCR record routine shown in FIGS. 11A and 11B.

DETAILED DESCRIPTION OF THE PREFERRED EMBODIMENTS

An embodiment of the invention will be detailed with reference to the accompanying drawings.

Figure 1:
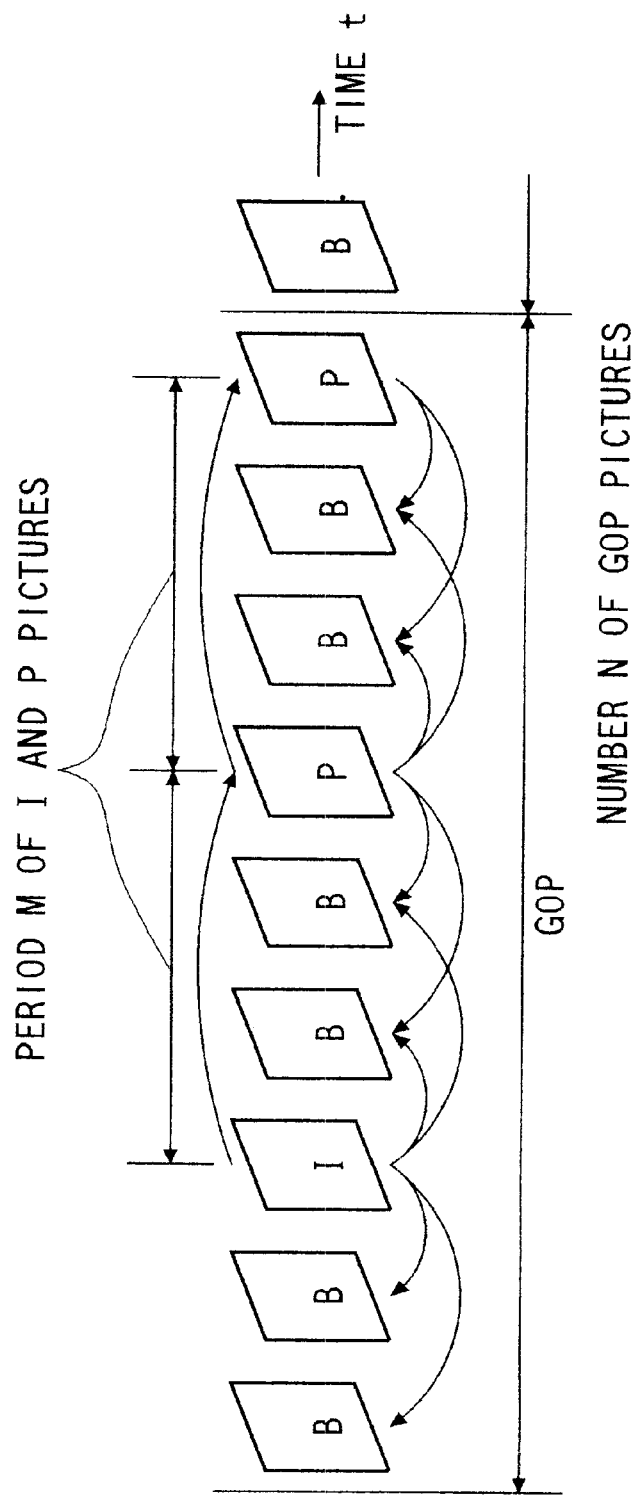
FIG. 1 is a diagram illustrating encoding of image data.
Figure 2:
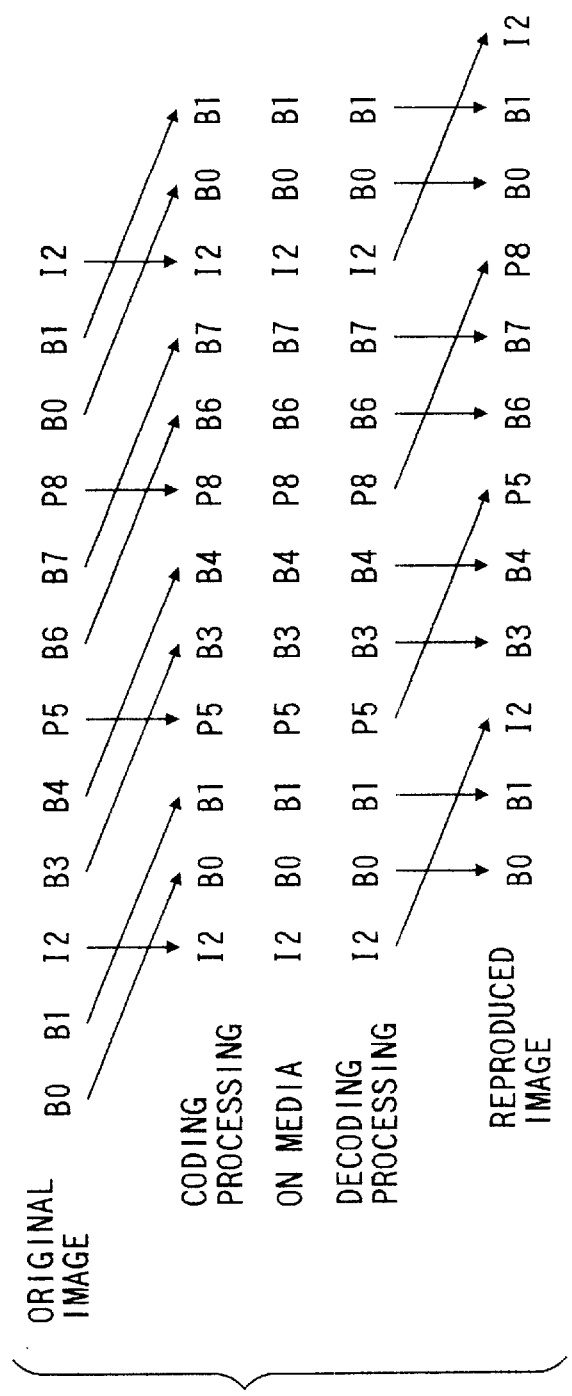
FIG. 2 is a diagram illustrating encoding and decoding of image data.
Figure 3B:
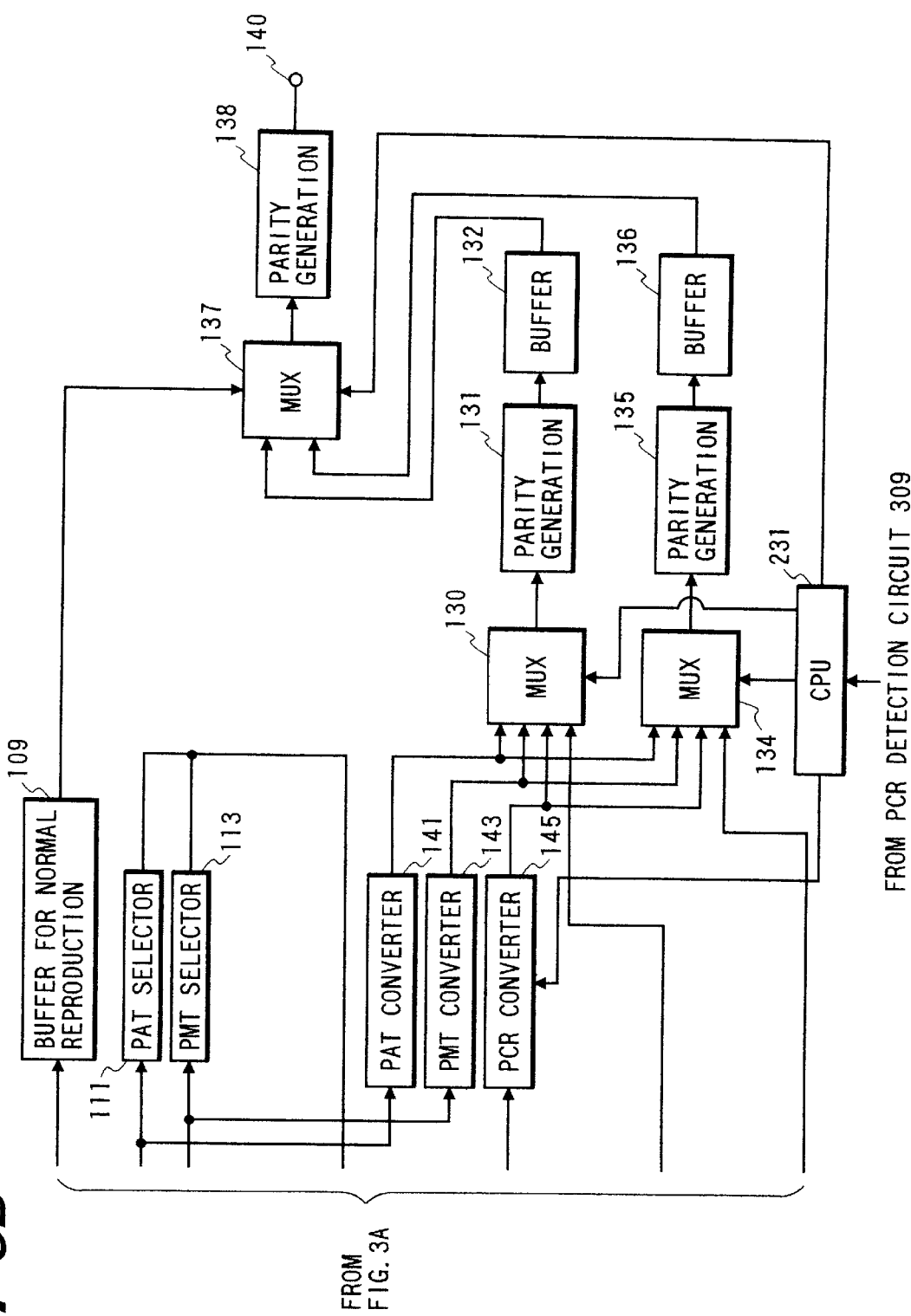
FIG. 3 which comprised of FIGS. 3A and 3B is a circuit block diagram showing the structure of the main parts of a recording/reproducing apparatus according to an embodiment of the invention.

In this embodiment, the invention is applied to an apparatus for recording and reproducing an MPEG 2 transport stream (hereinafter abbreviated as TS) or an ATV bit stream. FIGS. 3A and 3B are circuit diagrams showing the structure of a recording circuit of such a recording/reproducing apparatus.

Referring to FIGS. 3A and 3B, TS applied to an input terminal 101 is input to a transport packet synchronization detection circuit 104 and to a packet buffer 105. The transport packet synchronization detection circuit 104 detects sync_byte and the like in the transport header, the packet buffer 105 being used for controlling the operation timings of each circuit portion shown in FIGS. 3A and 3B.

The transport stream output from the packet buffer 105 is input to a switch 106, to a PCR detection circuit 108, and to a normal reproduction buffer 109.

Figure 4:
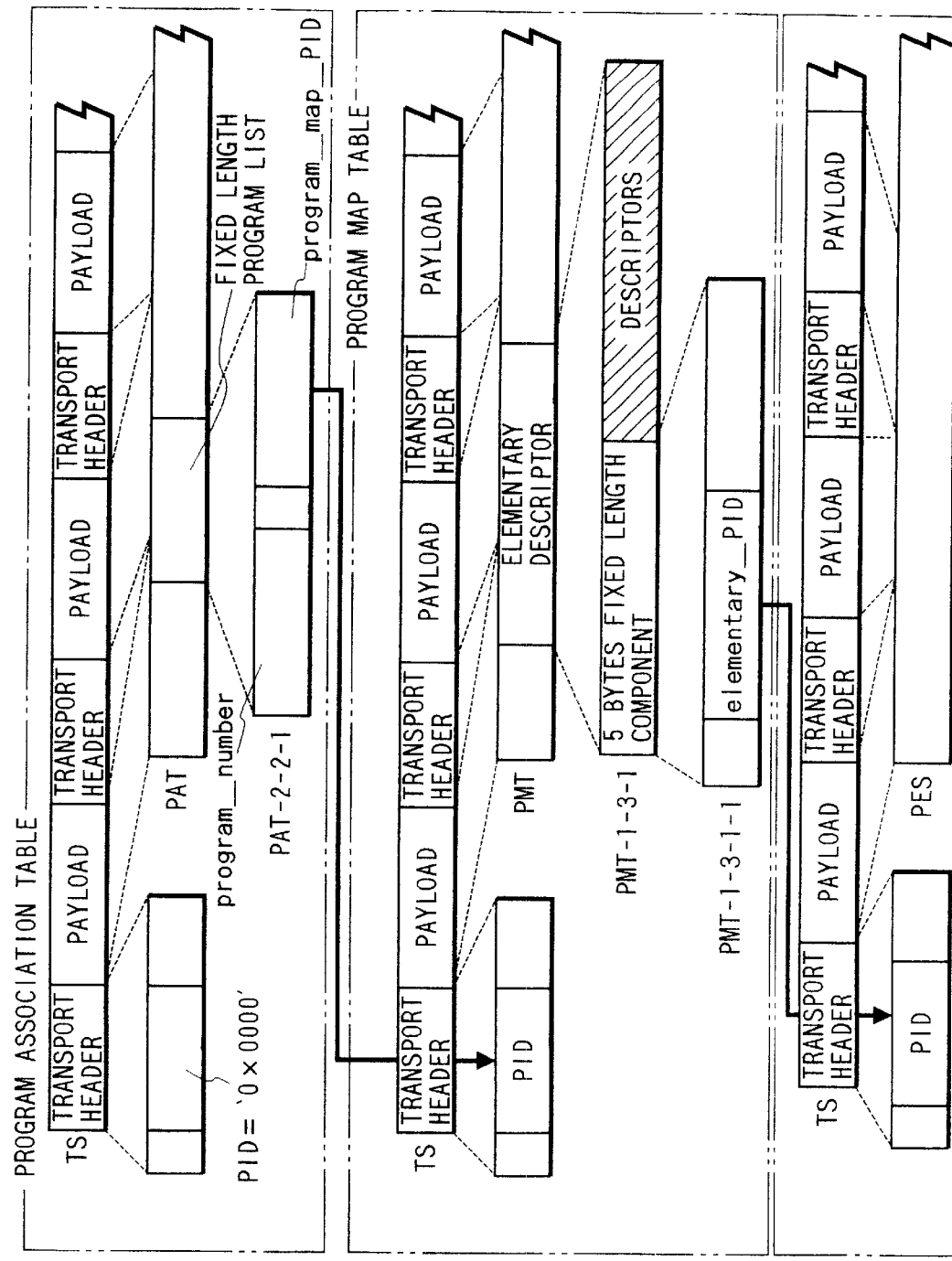
FIG. 4 is a diagram illustrating the operation of generating recording data by the circuit shown in FIGS. 3A and 3B.

FIG. 4 is a diagram illustrating an operation of selecting a desired program by the circuit shown in FIGS. 3A and 3B.

First, a PID detection circuit 107 detects a transport packet containing a PAT, i.e., a transport packet having a PID of the transport header of 0×0000, and when it is detected, the switch 106 is connected to a terminal a.

An input signal to the switch 106 is output from the terminal a and input to a PAT buffer 110.

The transport packet with PID of 0×0000 is down loaded in the PAT buffer 110. A PAT downloaded in the PAT buffer 110 is input to a PAT selector 111 and a PAT converter 141. The PAT selector 111 detects program_map_PID coincident with a program number to be recorded. Program_map_PID is a PID (elementary_PID) of a transport packet containing a program to be decoded and recorded and a PMT in which the PID is described.

The PAT selector 111 inputs the detected program_map_PID to the PID detection circuit 107.

The PID detection circuit 107 detects from TS a transport packet having a PID coincident with program_map_PID received from the PAT selector 111, and also detects as described above the transport packet containing a PAT.

As the PID detection circuit 107 detects a transport packet having a PID coincident with program_map_PID, it makes the switch 106 connect a terminal b. The transport packet output from the terminal b of the switch 106b is input to a PMT buffer 112. Therefore, the transport packet having a PID coincident with program_map_PID is downloaded into the PMT buffer 112. A PMT downloaded into the PMT buffer 112 is input to a PMT selector 113 and a PMT converter 143. The PMT selector 113 detects and selects from this PMT a PID (elementary_PID) of the transport packet having a desired program.

In this embodiment, elementary_PID detected by the PMT selector 113 is assumed to be a PID of the transport packet containing a video portion of a program to be recorded.

The PMT selector 113 inputs the selected elementary_PID to the PID detection circuit 107.

Similar to the above, as the transport packet containing a PAT is detected, the switch 106 is connected to the terminal a to repeat operations similar to the above.

As the PMT selector 113 detects elementary_PID, the PID detection circuit 107 detects from TS a transport packet having the same PID. At the same time, it detects a transport packet having a PID coincident with program_map_PID obtained by the PAT selector or a transport packet containing a PAT. As the PID detection circuit 107 detects a transport packet having a PID coincident with elementary_PID, the switch 106 is connected to a terminal c.

An input signal to the switch 106 is output from the terminal c. The transport packet having a PID coincident with elementary_PID is input to a PES header detection circuit 115 and a PES header buffer 116.

If a transport packet having PID coincident with program_map_PID is detected, the switch 106 is connected to the terminal b, whereas if a transport packet containing a PAT is detected, the switch 106 is connected to the terminal a. In both cases, operations similar to the above are executed.

A PCR detection circuit 108 detects a PCR from TS to synchronize TS, and inputs the detected PCR to a PCR converter 145. PCR is a 48-bit signal of 27 MHz and is used as a time stamp for obtaining a decoder timing.

Figure 5:
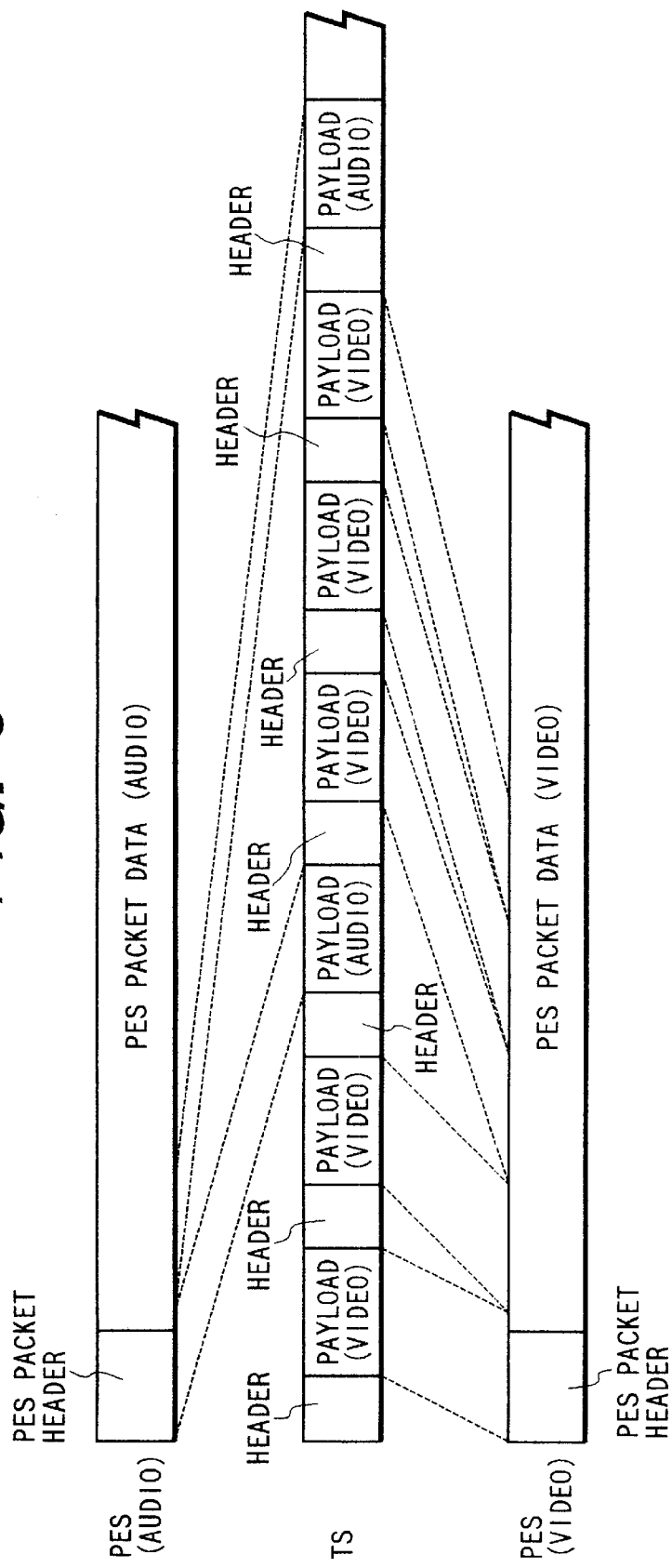
FIG. 5 is a diagram illustrating the operation of generating recording data by the circuit shown in FIGS. 3A and 3B.

A relationship between TS and PES is shown in FIG. 5. In FIG. 5, a desired program in TS is PES packetized. In this embodiment, a stream input to the PES header detection circuit 115 and PES header buffer 116 is a video PES of the program to be recorded. The PES header detection circuit 115 detects a PES header and the PES header buffer 116 buffers PES header information of a video packet to be recorded for specific reproduction.

The stream output from the PES header detection circuit 115 is input to a sequence header extension detection circuit 117 and a sequence header extension buffer 118. The sequence header extension detection circuit 117 detects a sequence header and a sequence extension, and the sequence header extension buffer 118 buffers the sequence header and sequence extension of video data to be recorded for specific reproduction. Parameters (such as image size and bit rate) effective for the image are described in the sequence header. Extension of the sequence header is described in the sequence extension.

The stream output from the sequence header extension detection circuit 117 is input to a picture header coding extension detection circuit 119 and a picture header coding extension buffer 120.

The picture header coding extension detection circuit 119 detects a stream of a picture header and a picture coding extension, and the picture header coding extension buffer 120 buffers the picture header and picture coding extension of video data to be recorded for specific reproduction. Information of the encoded image such as a coding type (I, P, B) is described in the picture header. Information necessary for decoding the encoded data such as a picture structure is described in the picture coding extension. If the picture type of a stream input to the picture header coding extension detection circuit 119 is an interframe encoded image, a switch 122 is connected.

The stream output from the picture header coding extension detection circuit 119 is input to a slice detection circuit 121.

The slice detection circuit 121 detects the header of a slice and inputs it to the switch 122. The slice detection circuit 121 controls to connect the switch 122 if a stream of an intra (intraframe) slice is input thereto.

As a stream of an intraframe encoded image or an intraslice comes to the switch 122, it is passed to the output of the switch.

A slice is constituted of a plurality of macroblocks (one macroblock at a minimum), and an intraslice is constituted of only intramacro blocks.

An output of the switch 122 is input to an I picture buffer 123 which buffers only intraframe encoded data and supplies it to multiplexers 147 and 149.

The PAT and PMT converters 141 and 143 changes an input PSI into another PSI or generates a new PSI in order to discriminate between various specific reproduction data and normal reproduction data and reproduce them separately. This operation will be described with reference to FIGS. 6A and 6B.

FIG. 6A shows an example of extracting a program to be recorded from an input PSI, according to this embodiment.

It is assumed that a program to be recorded has a program number of 0x0180.

PID of 0x0180 of PMT having the program 0x0180 is detected from PAT, and PID=0x181 and PID=0x182 having elementary streams of video and audio are detected from the packet of PID=0x0180 having PMT. In this manner, PIDs of a packet of video and audio to be recorded are obtained.

Figure 6B:
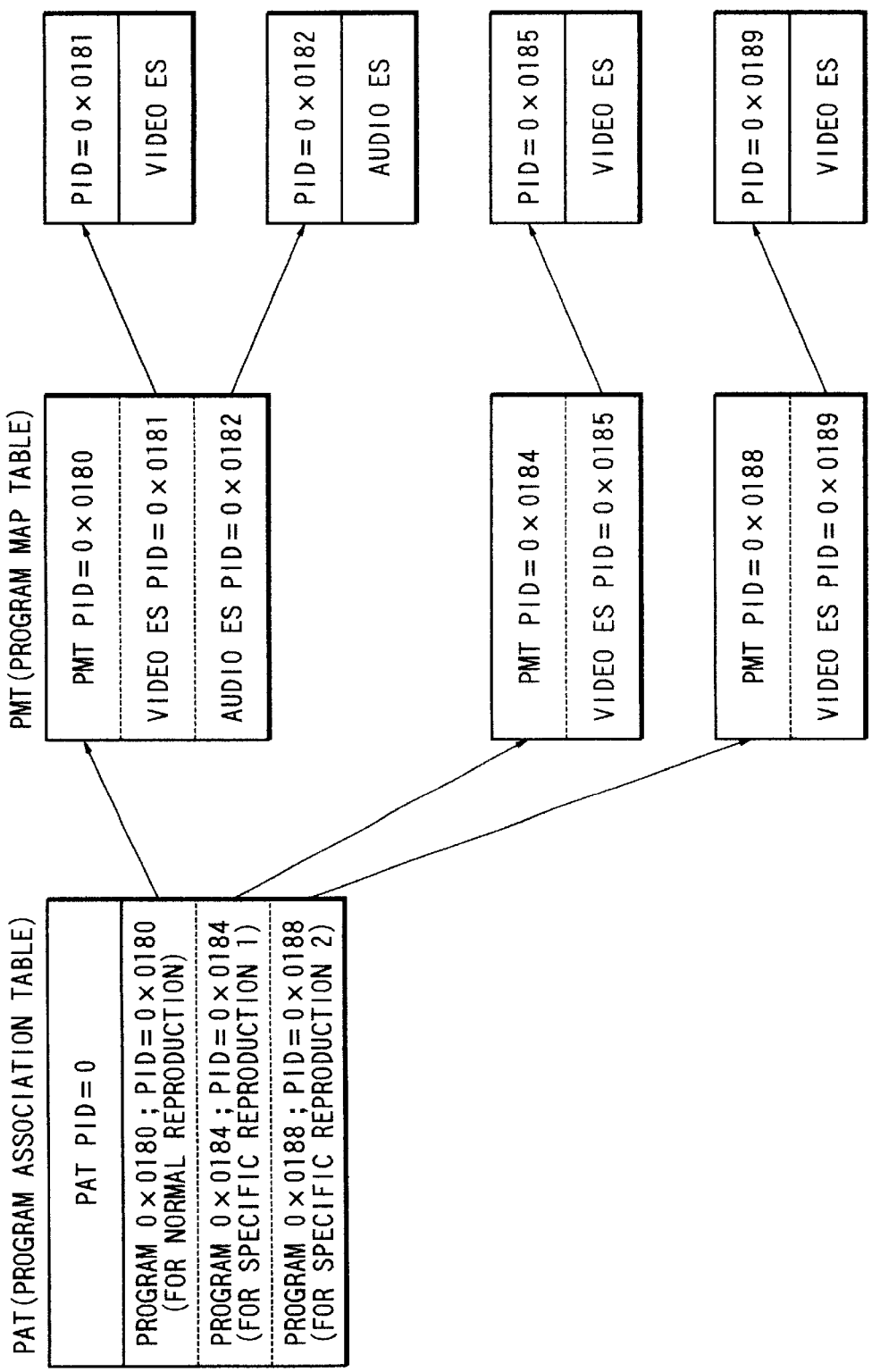

The operation of the PAT converter 141 and PMT converter 143 will be described with reference to FIG. 6B.

In this embodiment, specific reproduction speeds include fivefold and tenfold speeds. The PAT and PMT converters 141 and 143 newly set PAT and PMT for specific reproduction speed 1, i.e., fivefold speed and for specific reproduction speed 2, i.e., tenfold speed (in FIG. 6A, they are represented by "for specific reproduction 1" and "for specific reproduction 2". These specific reproduction speeds are used for other than normal reproduction).

As PAT, a program 0x0184, PID=0x0184 is set for specific reproduction 1, and a program 0x0188, PID=0x 0188 is set for specific reproduction. Next, each PMT is set. By using PMT for specific reproduction 1, PID=0x0185 of the elementary stream of video for specific reproduction 1 is set. Similarly, PID=0x0189 of the elementary stream of video for specific reproduction 2 is set. Further, PID=0x 0185 and PID=0x0189 are set for PIDs of transport packets of data for specific reproductions 1 and 2.

New PIDs for specific reproductions are set so as not to become duplicate with PID=0x0000 of PAT, PID=0x0001 of a conditional access table, PMT of normal recording/reproduction, and PID of each elementary stream for normal recording/reproduction. The program number of PAT is set so as not to become duplicate with the program number for normal recording/reproduction and the program number 0x0000 (which indicates PID of this program is network_ PID).

The PCR converter 145 changes an input PCR into a PCR for specific reproduction or generates a new PCR and supplies it to multiplexers 130 and 134 to which PAT and PMT are also supplied.

An example of a method of changing PCR by the PCR converter 145 will be described.

Figure 7:
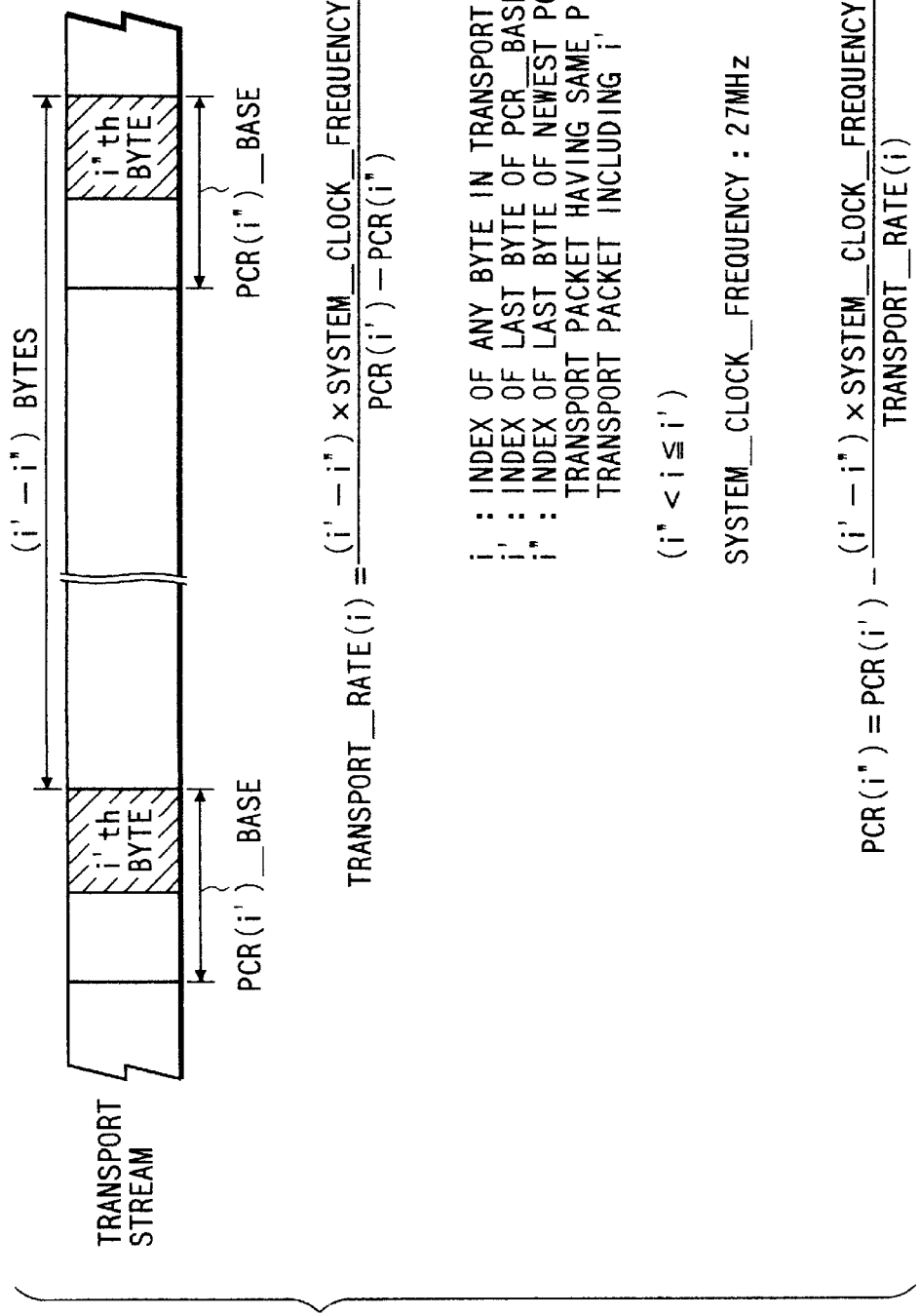
FIG. 7 is a diagram illustrating the operation of generating PCR by the circuit shown in FIGS. 3A and 3B.

FIG. 7 is a diagram illustrating a PCR change method. As described earlier, PCR is a time stamp for obtaining a decoder timing.

As a PCR is detected by the PCR detection circuit 108, the PCR converter calculates transport_rate (i) indicated by the equation (1) in FIG. 7, and generates a new PCR for specific reproduction at a predetermined period to record data. A new PCR (i") can be calculated by using the equation (2). The PCR converter 145 generates the calculated PCR (i") and repeats the above operations at the predetermined period.

The last calculated PCR (i") is used as PCR (i') to calculate the new PCR (i").

The multiplexer 130 multiplexes PSI, header information for each layer, and intraframe encoded data in order to use the results for specific reproduction. The multiplex timing is controlled by a CPU 231 to be described later. An output of the multiplexer 130 is added with an error correction code by a parity generation circuit 131 and input via a buffer 132 to a multiplexer 137 as data for specific reproduction 1.

Similarly, the multiplexer 134 multiplexes PSI, header information for each layer, and intraframe encoded data in order to use the results for specific reproduction. An output of the multiplexer 134 is added with an error correction code by a parity generation circuit 135 and input via a buffer 136 to the multiplexer 137 as data for specific reproduction 2.

Normal reproduction data is input to the multiplexer 137 via the normal reproduction buffer 109.

The multiplexer 137 multiplexes normal reproduction data output from the normal reproduction buffer 109, specific reproduction 1 data output from the first buffer 132, and specific reproduction 2 data output from the first buffer 136, at locations on each track of a magnetic tape allowing reproduction at each reproduction speed, in order to convert the multiplexed results into a specific recording track format. The data having this recording track format is input to a parity generation circuit 138 which adds an error correction code. The obtained record data is output from a terminal 140.

Next, recording a video/audio signal output from the circuit shown in FIGS. 3A and 3B on a magnetic tape and reproducing it will be described.

Figure 8:
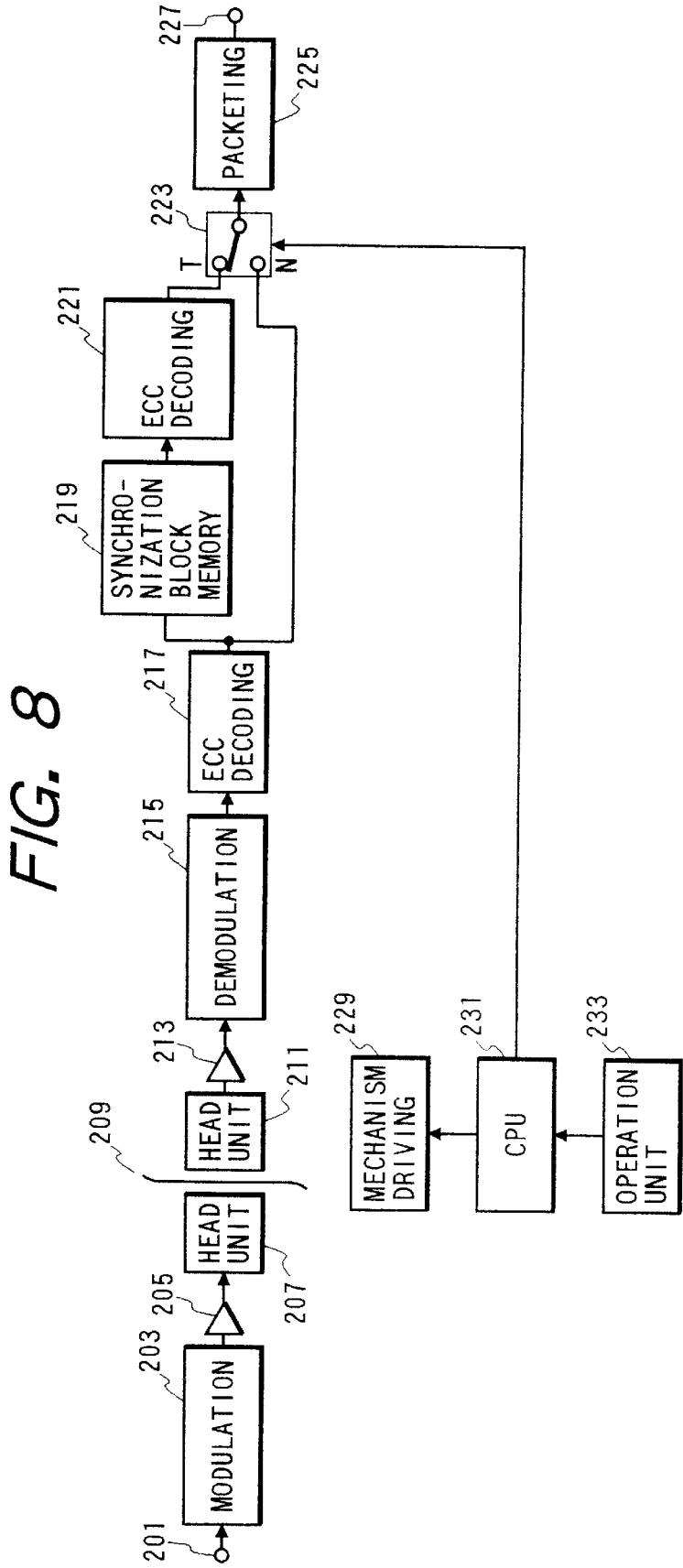
FIG. 8 is a diagram showing the apparatus for recording and reproducing data generated by the circuit shown in FIGS. 3A and 3B.

FIG. 8 is a block diagram showing the structure of a recording/reproducing apparatus for a signal output from the circuit shown in FIGS. 3A and 3B.

A data stream containing specific reproduction packets output from the terminal 140 shown in FIGS. 3A and 3B is applied to an input terminal 201 shown in FIG. 8 and subjected to a digital signal processing by a modulation circuit 203 to multiplex a pilot signal component for tracking control.

The modulated data is amplified by a recording amplifier 205 and recorded on a tape 209 with a head unit 207 having heads a and b with different azimuth angles.

Figure 9:
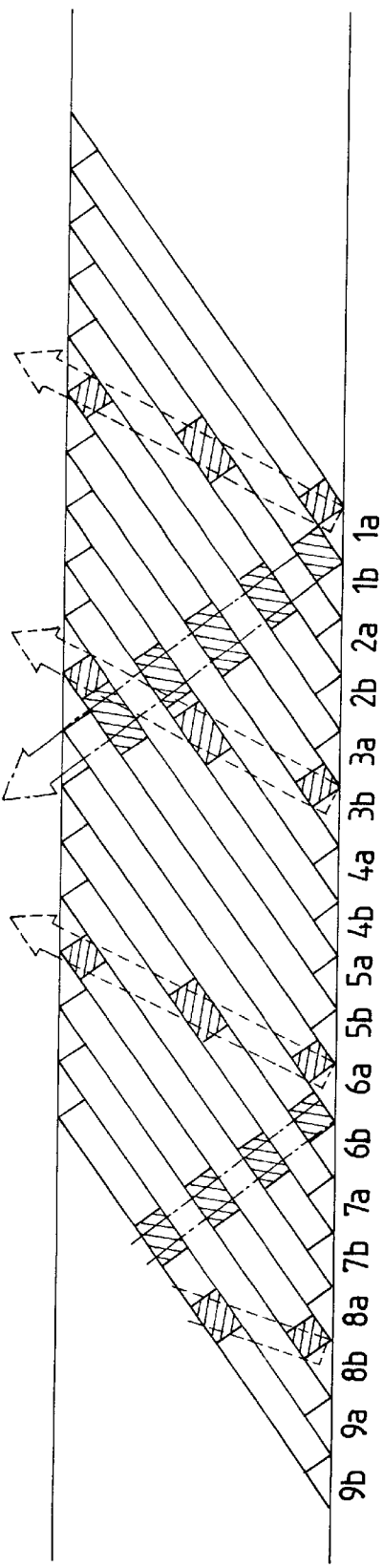
FIG. 9 is a diagram showing the format on a tape loaded in the apparatus shown in FIG. 8.

A record format on a tape is shown in FIG. 9.

In FIG. 9, 1a, 2a, ..., 9a represent tracks formed by the head a having an azimuth angle of +θ°, and 1b, 2b, ..., 9b represent tracks formed by the head b having an azimuth angle of −θ°.

A broken line arrow indicates a track locus of each head performing specific reproduction at a fivefold speed, and a one-dot chain line arrow indicates a track locus of each head performing specific reproduction at a tenfold speed.

A hatched area in each track is an area in which specific reproduction data is recorded. The circuit shown in FIGS. 3A and 3B multiplexes data of normal reproduction and specific reproductions 1 and 2 so as to realize the recording format described above.

In reproducing data, a signal reproduced with a head unit 211 is amplified by an amplifier 213 and applied to a demodulation circuit 215. The demodulation circuit 215 binarizes the reproduced signal and demodulates the data by detecting a synchronization signal. The demodulated data is supplied to an error correction code (ECC) decoding circuit 217 which detects and corrects an error in the demodulated data by using the parity data added at the time of recording. The error-corrected data is output to a synchronization block memory 219 and a switch 223.

During normal reproduction, the switch 223 is connected to an N contact under the control of CPU 231. Therefore, only the normal reproduction data (I, B, and P encoded data) is supplied to a packetizing circuit 225 and packetized in accordance with a packet format of a transport stream of ATV or MPEG 2 to be output from an output terminal 227.

During specific reproduction, specific reproduction data at a specific reproduction speed is input to the synchronization block memory 219. The synchronization block memory 219 stores and reconfigures intraframe encoded image, header information, and program information, and outputs the reconfigured data to an ECC decoding circuit 221 to detect and correct an error in the data. An output of the ECC decoding circuit 221 is output via a T contact of the switch 223 to the packetizing circuit 225 which packetizes the data and outputs it from the output terminal 227.

In order to allow an ATV decoder to decode and display specific reproduction images, the synchronization block memory 219 sets DSM_trick_mode_flag in the PES header of a reproduction bit stream to "1" and changes a DSM trick mode field into a specific reproduction mode, to thereafter output the bit stream.

Figure 10:
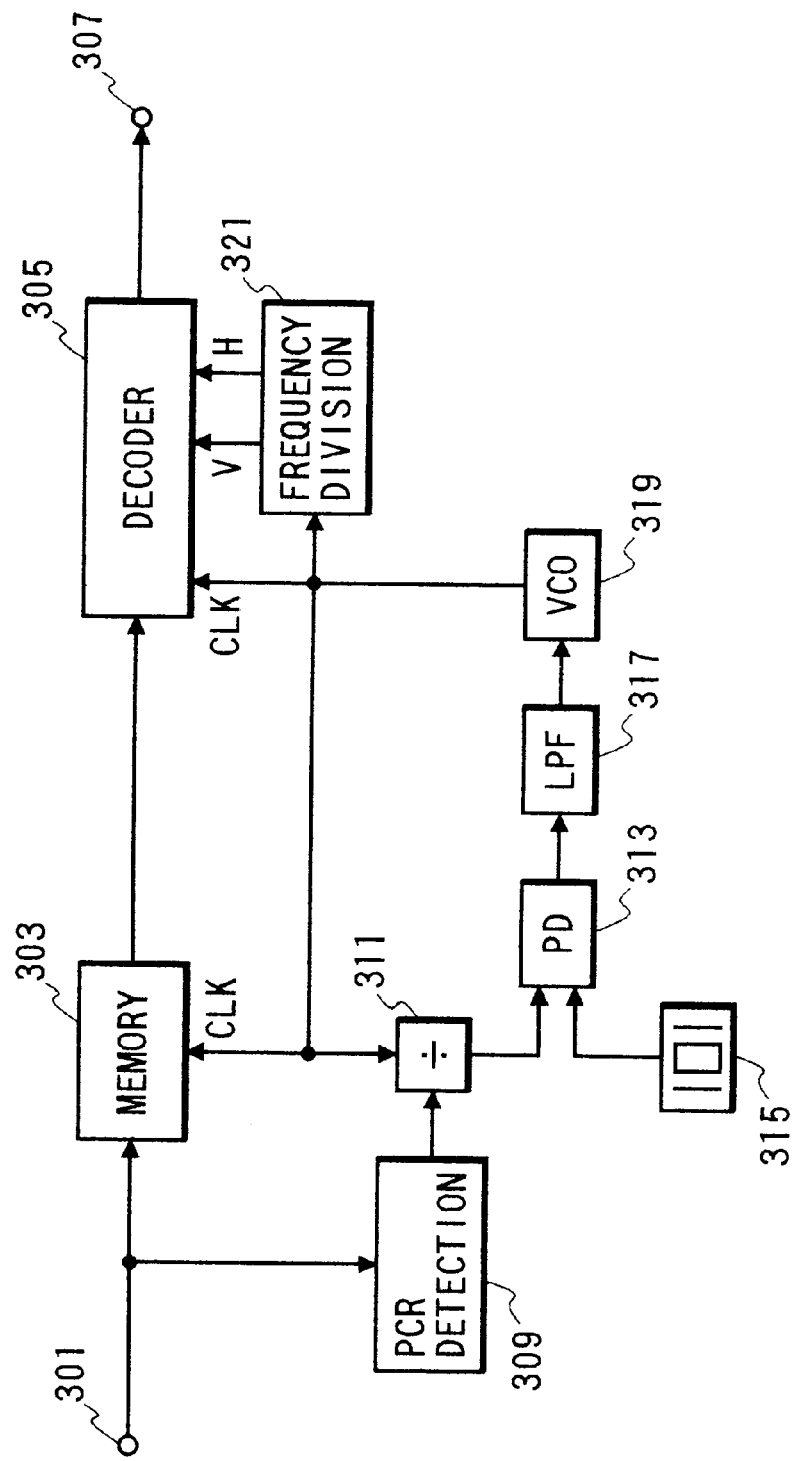
FIG. 10 is a diagram showing the structure of an ATV decoder of the apparatus shown in FIG. 8.

A bit stream output from the output terminal 227 is input to an ATV decoder and decoded with it. The operation of the ATV decoder will be described with reference to FIG. 10. A bit stream output from the output terminal 227 shown in FIG. 8 and applied to an input terminal 301 shown in FIG. 10 is input to an FIFO memory 303 and a PCR detection circuit 309. The PCR detection circuit which extracts a PCR packet in the data stream calculates an average data rate by using the equation shown in FIG. 7, and outputs it to a frequency division circuit 311. The FIFO memory 303 averages packetized discontinuous data and outputs it to a decoder 305.

A phase detector 313, an LPF 317, and a VCO 319 constitute a PLL. A reference clock supplied to the phase detector 313 from a reference clock generator 315 and a clock output from the frequency division circuit are controlled to have a predetermined phase. Therefore, a clock generated by VCO 319 is controlled to have a transport rate of the PCR packet. In accordance with the clock and its frequency divided clock divided by a frequency division circuit 321 and corresponding to a horizontal/vertical scan period of TV signals, data is read from the FIFO memory 303 at a predetermined rate. Therefore, a stable image signal can be output from an output terminal 307.

CPU 231 receives signals from switches on an operation unit 233 and from switches on mechanical parts, and in accordance with these signals, controls a mechanism driving unit 229 to instruct the rotation direction and speed of an unrepresented capstan motor to transfer a tape. In the following, the operation of CPU 231 performing a so-called tie image pickup by using the recording/reproducing apparatus of this embodiment will be described.

Upon instruction of image recording by a switch on the operation unit 233, CPU 231 starts a tie image pickup. First, in this embodiment, in order to maintain continuity of PCRs as will be later described, the capstan motor is reverse rotated to rewind a tape about 40 tracks. Next, a reproduction operation is performed under tracking control similar to normal reproduction. After tracking becomes normal, a specific reproduction PCR detected with the PCR detection circuit 309 shown in FIG. 10 from a specific reproduction data stream is stored in an internal register. The PSI converter is controlled to generate a new PCR from the stored PCR. Reproduction is terminated at the track containing a last image of GOP after detection of PCR, and the recording operation starts from the next track.

Figure 11B:
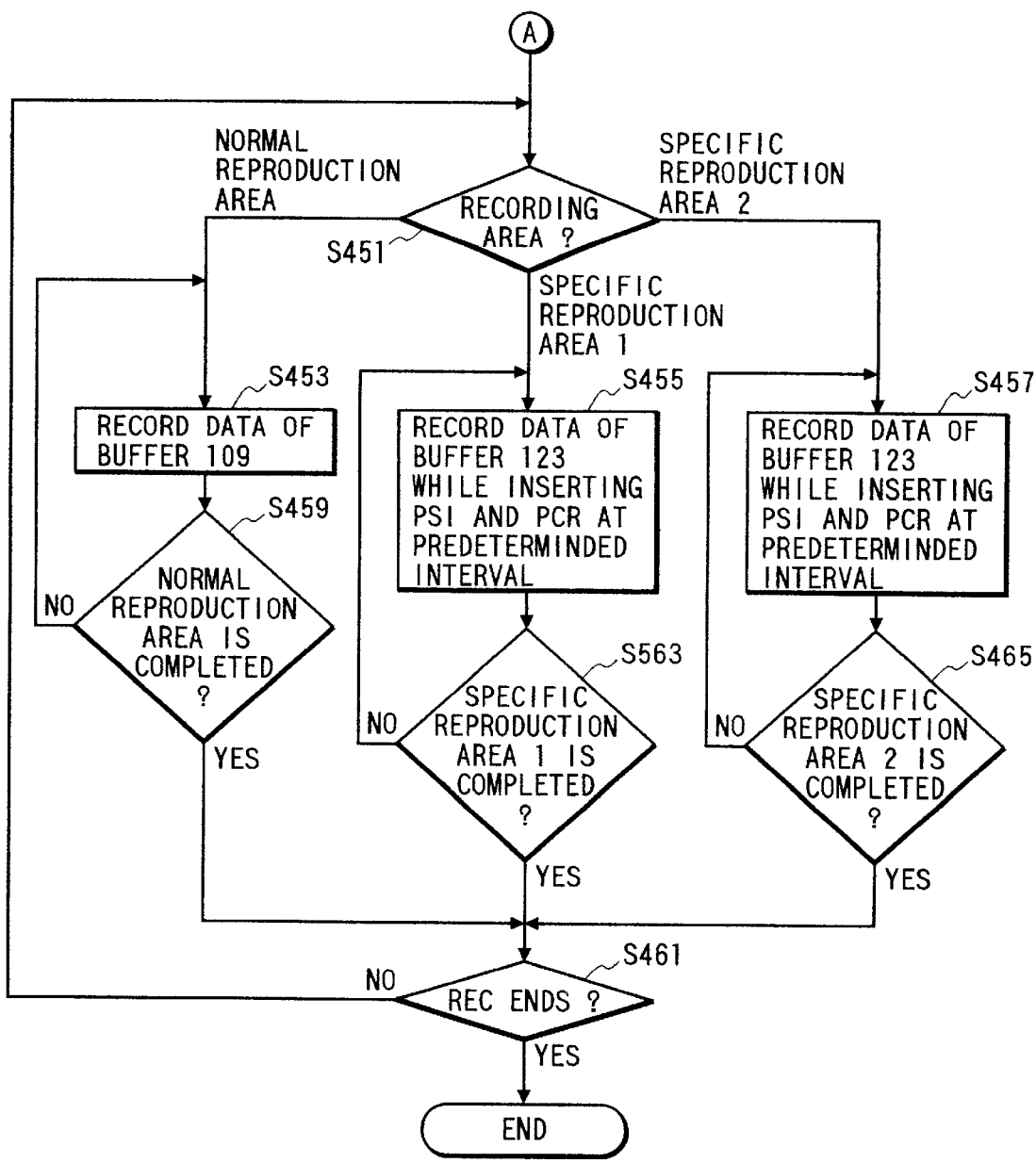
FIG. 11 which comprised of FIGS. 11A and 11B shows the format illustrating the operation of the apparatuses shown in FIGS. 3A, 3B and 8.

FIGS. 11A and 11B are flow charts illustrating the above operation of CPU 231. This operation will be detained with reference to the flow charts of FIGS. 11A and 11B.

As an image recording instruction is issued from the operation unit 233 (Step S401), a magnetic tape is rewound by 40 tracks (Step S403). The rewinding amount corresponds to a sum of a period of PCR (e.g., maximum period of 0.1 second) and a time required for normal tracking after reproduction. Since PCR is transmitted at least one in 0.1 second, it is assumed in this embodiment that at least one track among 30 tracks contains a PCR packet. A reproduction operation under tracking control is performed (Step S405), and when tracking becomes normal (Step S407), a recording operation is performed (Step S409).

In this embodiment, a record area for specific reproduction data is different for each track as shown in FIG. 9. Therefore, MUX 137 is controlled (Step S411) to output data in accordance with whether the area traced by the head unit is a record area of normal reproduction data, specific reproduction 1 data, or specific reproduction 2 data.

If the record area is for normal reproduction data, normal reproduction data in the normal reproduction buffer 109 is recorded (Step S413). The end of the normal reproduction area is monitored, and if this area ends, the next record area is checked (Step S415).

If the record area is for specific reproduction 1 data, PAT and PMT essential for data decoding are sequentially recorded (Steps S417 and S421), and then PCR for time reference is recorded (Step S423).

A PCR record routine Step S423 will be described with reference to FIG. 12.

FIG. 12 is a flow chart illustrating the operation of the PCR record routine. CPU 231 checks whether PCR of a target PSI of specific reproduction data has been detected (Step S501). If detected, as described earlier, the PCR converter 145 is controlled (Step S503) to calculate the next PCR by using PCR detected with the PCR detection circuit 309 shown in FIG. 10 so as to be continuous with the last recorded PCR, and to record the calculated PCR.

If PCR of a target PSI is not detected, a discontinuity flag representative of discontinuous PCRs is set to make the PCR converter 145 generate a new PCR (Step S505).

After PCR is recorded, specific reproduction 1 data in the I picture buffer 123 is recorded (Step S425), and the end of this record area is monitored, and if the end is detected, the next record area is checked (Step S427).

Similarly, if the record area is for specific reproduction data, PAT, PMT, and PCR are recorded in this order (Steps S419, S429, and S431), and then specific reproduction 2 data in the I picture buffer 123 is recorded (Step S433), and the end of this record area is monitored, and if the end is detected, the next record area is checked (Step S435).

After each data is recorded as described above, data is again read from MUX 137 in accordance with each record area (Step S451).

If the record area is for normal reproduction data, normal reproduction data in the normal reproduction buffer 109 is recorded (Step S453).

The end of this normal reproduction area is monitored (Step S459).

If the record area is for specific reproduction 1 data, PSI and PCR are inserted at a predetermined interval, and specific reproduction 1 data in the I picture buffer 123 is recorded (Step S455). The end of this area is monitored (Step S463).

Similarly, if the record area is for specific reproduction 2 data, PSI and PCR are inserted at a predetermined interval, and specific reproduction 2 data in the I picture buffer 123 is recorded (Step S457). The end of this area is monitored (Step S465).

After data of one track is recorded, an image recording end instruction from the operation unit 233 is monitored. If there is no instruction, data is recorded for the next track (Step S461).

The record area may be discriminated in accordance with a count of a counter of CPU 231 which counts a reference clock of a rotary phase detection signal of a rotary head. In this case, the count is required to change for each track because the record area of specific reproduction data is different at each track.

As described so far, in this embodiment, even if a signal encoded by motion compensation prediction coding is reproduced from a recording medium, good specific reproduction images can be obtained because additional information such as PCR and PSI in an input bit stream as well as specific reproduction data is newly generated and multiplexed with normal reproduction data.

In this embodiment, for tie image pickup by generating specific reproduction data, PCR is multiplexed after PSI. Therefore, during tie image pickup, PCR of specific reproduction data is not recorded before the PSI packet such as PAT and PMT.

Therefore, it is possible to prevent a delay in image reproduction at the tied image portion.

In the above embodiment, the invention is applied to an apparatus for recording and reproducing an ATV bit stream. The invention is also applicable to other systems in which data identification information and clock information are multiplexed for transmission and recording.

In the above embodiment, during tie image pickup, PCR in the last recorded data is reproduced, and a new PCR is generated so as to be continuous with the reproduced PCR. Therefore, PCRs of specific reproduction data do not become discontinuous, and the continuity of PCRs can be retained.

It is therefore possible to prevent a delay in image reproduction at the image tying portion.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording apparatus for newly recording a second encoded data train on a recording medium on which a first encoded data train composed of a plurality of packets is recorded, comprising:

reproducing means for reproducing said first encoded data train from the recording medium, said first encoded data train comprising encoded image data and clock data for generating a clock signal for decoding the encoded image data;

generating means for generating clock data for said second encoded data train by using the clock data in said first encoded data train reproduced by said reproducing means;

multiplexing means for multiplexing the clock data for said second encoded data train generated by said generating means and input encoded image data and for forming said second encoded data train composed of a plurality of packets; and recording means for recording the second encoded data train formed by said multiplexing means on the recording medium.

2. An apparatus according to claim 1, wherein said first encoded data train includes data for normal reproduction and data for specific reproduction respectively containing said encoded image data and said clock data.

3. An apparatus according to claim 2, wherein said generating means generates said clock data by using clock data in said data for specific reproduction of the first encoded data train reproduced by said reproduction means.

4. An apparatus according to claim 3, wherein said generating means generates said clock data by predetermined calculation by using clock data in said data for specific reproduction.

5. An apparatus according to claim 2, wherein said multiplexing means comprises:

second generating means for generating said data for reproduction and said data for specific reproduction by using said input encoded image data.

6. An apparatus according to claim 5, wherein said input encoded image data includes first image data encoded by intraframe encoding and second image data encoded by interframe encoding, and said second generating means generates said data for specific reproduction by using said first image data in said input encoded data.

7. An apparatus according to claim 5, wherein said second generating means generates said data for specific reproduction by multiplexing the clock data from said generating means and said input encoded image data.

8. An apparatus according to claim 7, wherein said recording means records said data for specific reproduction on the recording medium in a predetermined area of each track of a number of tracks formed on the recording medium with a rotary head.

9. A recording apparatus, comprising:

inputting means for inputting an encoded data train;

generating means for generating a data train for normal reproduction and a data train for specific reproduction, respectively composed of a plurality of packets and respectively including encoded image data and clock data, and for generating a clock signal for decoding the encoded image data by using the input encoded data train, said generating means including clock generating means for generating clock data for said data train for specific reproduction and multiplexing the generated clock data for said data train for specific reproduction and said encoded image data to generate said data train for specific reproduction, said data train for specific reproduction being composed of the packet having the generated clock data and the packet of the encoded image data;

recording means for recording said data train for specific reproduction on a recording medium in a predetermined area and recording said data train for normal reproduction on the recording medium in an area other than the predetermined area; and control means for controlling said multiplexing means, in response to start of recording of said data train for specific reproduction, so that the packet having the generated clock data is recorded first and subsequently the packet of the encoded image data is recorded.

10. An apparatus according to claim 9, wherein said recording means records said data train for specific reproduction and said data train for normal reproduction by forming a number of tracks on the recording medium with a rotary head.

11. An apparatus according to claim 10, wherein said predetermined area is an area corresponding to a locus on the recording medium traced by the rotary head during specific reproduction.

12. A recording apparatus for newly recording a second encoded data train on a recording medium on which an encoded data train is recorded, comprising:

input means of inputting a first encoded data train composed of a plurality of packets each of which has a packet ID data, the first encoded data train including encoded image data of a plurality of programs, program specific information describing packet ID numbers of the plurality of programs, and clock data for generating a clock signal for decoding the decoded image data, the program specific information being included in the packets different from the packets of the encoded image data, the encoded image data comprising first image data encoded through intraframe encoding and second image data encoded through interframe encoding;

extracting means for extracting said encoded image data and said program specific information from said first encoded data train;

changing means for changing the contents of said program specific information extracted by said extracting means;

reproducing means for reproducing the recorded encoded data train from the recording medium;

clock generating means for generating the clock data by using the recorded encoded data train reproduced from a portion immediately before a recording start position of the recording medium;

generating means for generating the second encoded data train composed of a plurality of packets each of which has packet ID data by multiplexing the packet of said encoded image data extracted by said extracting means, the packet of program specific information output from said changing means and the packet having said clock data generated by said clock data generating means, said program specific information output from said changing means being included in the packet different from the packet of said encoded image data;

recording means for recording the second encoded data train generated by said generating means in a predetermined area of a recording medium; and controlling means responsive to an instruction of starting the recording, for controlling said generating means and said recording means so that the packet of the program specific information output changing means is recorded first and subsequently the packet including the clock data generated by said clock data generating means is recorded.

* * * * *

UNITED STATES PATENT AND TRADEMARK OFFICE
CERTIFICATE OF CORRECTION

PATENT NO. : 6,292,621 B1
DATED : September 18, 2001
INVENTOR(S) : Yasuyuki Tanaka et al.

It is certified that error appears in the above-identified patent and that said Letters Patent is hereby corrected as shown below:

Column 1,
Line 55, "nizationrronization" should read -- nization --; and
Line 60, "above mentioned" should read -- above-mentioned --.

Column 3,
Line 6, "comprised" should read -- is comprised --;
Line 26, "comprised" should read -- is comprised --; and
Line 61, "down loaded" should read -- downloaded --.

Column 5,
Line 38, "changes" should read -- change --;
Line 39, "generates" should read -- generate --; and
Line 66, "reproduction." should read -- reproduction 2. --.

Column 8,
Line 35, "detained" should read -- detailed --.

Column 11,
Line 13, "multiplexing the" should read -- multiplexing means for multiplexing the --.

Signed and Sealed this

Thirtieth Day of April, 2002

Attest:

JAMES E. ROGAN
*Attesting Officer*  *Director of the United States Patent and Trademark Office*